(12) United States Patent
Hu

(10) Patent No.: US 10,780,934 B2
(45) Date of Patent: Sep. 22, 2020

(54) SEAT ROD CLAMP ASSEMBLY AND VEHICLE

(71) Applicant: BEIJING MOBIKE TECHNOLOGY CO., LTD., Beijing (CN)

(72) Inventor: Weiwei Hu, Beijing (CN)

(73) Assignee: BEIJING MOBIKE TECHNOLOGY CO., LTD., Beijing (CN)

( * ) Notice: Subject to any disclaimer, the term of this patent is extended or adjusted under 35 U.S.C. 154(b) by 275 days.

(21) Appl. No.: 16/130,152

(22) Filed: Sep. 13, 2018

(65) Prior Publication Data

US 2019/0077478 A1 Mar. 14, 2019

(30) Foreign Application Priority Data

Sep. 13, 2017 (CN) .................. 2017 2 1171878 U

(51) Int. Cl.
*B62J 1/08* (2006.01)
*B62K 19/36* (2006.01)
*B62K 19/30* (2006.01)

(52) U.S. Cl.
CPC .............. *B62J 1/08* (2013.01); *B62K 19/36* (2013.01); *B62J 2001/085* (2013.01); *B62K 19/30* (2013.01); *B62K 2206/00* (2013.01)

(58) Field of Classification Search
CPC ....... B62J 1/08; B62J 2001/085; B62K 29/36; B62K 2206/00; B62K 19/30
See application file for complete search history.

(56) References Cited

U.S. PATENT DOCUMENTS

| 2,304,343 | A |   | 12/1942 | Diesbach |   |
|---|---|---|---|---|---|
| 5,823,058 | A | * | 10/1998 | Arbeiter | B62K 23/04 |
|   |   |   |   |   | 74/489 |
| 7,722,129 | B2 | * | 5/2010 | Cusack | B62K 25/02 |
|   |   |   |   |   | 301/124.2 |
| 2002/0076266 | A1 |   | 6/2002 | Mandon et al. |   |

(Continued)

FOREIGN PATENT DOCUMENTS

| CN | 102700597 | 10/2012 |
|---|---|---|
| CN | 207191230 | 4/2018 |

(Continued)

OTHER PUBLICATIONS

International Search report of the International Searching Authority corresponding to International Patent Application No. PCT/CN2018/105316, dated Dec. 19, 2018. (6 pages with English translation).

*Primary Examiner* — Kevin Hurley
*Assistant Examiner* — Marlon A Arce
(74) *Attorney, Agent, or Firm* — Myers Bigel, P.A.

(57) ABSTRACT

A seat rod clamp assembly and a vehicle is described. The seat tube clamp assembly includes an annular hoop having a notch, the annular hoop having a locking portion on each side of the notch, and the annular hoop having a post hole. The seat tube clamp assembly includes a wrench rotatably connected to the two locking portions, and at least one pair of eccentric washers, such that one of the eccentric washers is fixed to one of the locking portions, the other of the eccentric washers is correspondingly fixed to the wrench, an end surface of each of the eccentric washers has an inclined surface, and the end surfaces of the two eccentric washers are abutted against each other.

10 Claims, 5 Drawing Sheets

(56) References Cited

U.S. PATENT DOCUMENTS

| | | | | |
|---|---|---|---|---|
| 2002/0166941 A1* | 11/2002 | Dunlap | ................... | B62J 1/08 |
| | | | | 248/599 |
| 2007/0145814 A1 | 6/2007 | D Aluisio | | |
| 2013/0113242 A1* | 5/2013 | Connors | ................... | B62J 1/08 |
| | | | | 297/215.13 |
| 2014/0239682 A1* | 8/2014 | Tisue | ................... | B62J 1/08 |
| | | | | 297/215.14 |

FOREIGN PATENT DOCUMENTS

| | | |
|---|---|---|
| EP | 2505457 | 10/2012 |
| EP | 3456616 | 3/2019 |

\* cited by examiner

SEAT ROD CLAMP ASSEMBLY AND VEHICLE

CROSS-REFERENCE TO RELATED APPLICATIONS

This application claims priority to Chinese Patent Application No. 201721171878.7, filed on Sep. 13, 2017, which is hereby incorporated by reference in its entirety.

TECHNICAL FIELD

The present utility model belongs to the technical field of vehicle structures, and in particular to a seat rod assembly and a vehicle.

BACKGROUND

Two-wheeled vehicles such as bicycles and electric bicycles are important means of transportation in modern life and are widely used. In recent years, the business model of shared bicycles has developed rapidly, further driving the development of the bicycle industry.

The performance requirements on a publicly available bicycle are different from those of a conventional bicycle. On one hand, public bicycles have a certain degree of demand for riding comfort. Such problems as riding difficulty and inconvenient use will reduce their utilization rate and market competitiveness. More importantly, the use conditions of public bicycles are relatively poor, which has high requirements on the reliability and service life of bicycles. If the damage rate of public bicycles is too high, it will impose a heavy burden on maintenance and operation, and consumers will not be able to use the vehicle smoothly. On the other hand, the shared bicycles in commercial operation have certain requirements on their appearance, and a novel and beautiful appearance is more easily favored by consumers. In addition to public bicycles, there are also such performance requirements for vehicles such as electric bicycles and electric two-wheelers.

The seat height of a public bicycle is usually fast adjustable, and a quick release clamp is generally used to fix the seat rod. When adjustment is required, a user can open the quick release clamp and adjust the height of the seat rod. However, existing quick release clamps have drawbacks. First, the tightness of the quick release clamp needs to be controlled by screws, which is difficult to operate. Secondly, the quick release clamp needs to be pulled laterally, the wrench is small, but the force required for opening and closing is large.

Therefore, it is necessary to improve the quick release clamp and other structures of the vehicle to meet the higher requirements of the new business model for vehicle performance.

SUMMARY

It is an object of the present utility model to provide an improved seat rod clamp assembly.

According to an aspect of the present utility model, a seat rod clamp assembly is provided, comprising: an annular hoop having a notch, the annular hoop having a locking portion on each side of the notch, the annular hoop having a post hole, the annular hoop being configured such that when the locking portions get close to each other, the post hole is deformed and locked; a wrench rotatably connected to the two locking portions, the wrench being configured to be axially rotatable along the axial direction of the post hole to a locking position and a release position; and at least one pair of eccentric washers, wherein one of the eccentric washers is fixed to one of the locking portions, the other of the eccentric washers is correspondingly fixed to the wrench, an end surface of each of the eccentric washers has an inclined surface, and the end surfaces of the two eccentric washers are abutted against each other, and wherein each pair of eccentric washers is configured such that: when the wrench is rotated to the locking position, the overall thickness of the two eccentric washers is thickened under the abutting guidance action of the inclined surface to make the two locking portions get close to each other.

Optionally, the annular hoop is configured such that when the two locking portions get apart from each other, the post hole is deformed and released; and when the wrench is rotated to the release position, the overall thickness of the two eccentric washers is thinned by the end surfaces being adhered to each other so that the two locking portions get apart from each other.

Optionally, the seat rod clamp assembly comprises two pairs of eccentric washers, wherein the two pairs of eccentric washers respectively correspond to two locking portions, the wrench has two arms, and the two arms form a one-to-one rotational connection with the two locking portions.

Optionally, the end surface of the eccentric washer extends at the highest point of the inclined surface to form a horizontal platform surface, and when the wrench is rotated to the locking position, the horizontal platform surfaces of the two eccentric washers are abutted against each other.

Optionally, the end surface of the eccentric washer extends at the highest point of the inclined surface to form a horizontal platform surface, and when the wrench is rotated to the locking position, the horizontal platform surfaces of the two eccentric washers are abutted against each other; and the end surface of the eccentric washer extends at the lowest point of the inclined surface to form a horizontal bottom surface, and when the wrench is rotated to the release position, the horizontal bottom surface of one eccentric washer and the horizontal platform surface of the other eccentric washer are abutted against each other.

Optionally, the end surface of the eccentric washer has at least two inclined surfaces distributed in a rotationally symmetric manner and is formed with a stepped stop surface, the horizontal platform surface at the highest point of one inclined surface and the horizontal bottom surface at the lowest point of the other inclined surface are connected by the stepped stop surface, and when the wrench is rotated to the release position, the stepped stop surfaces of the two eccentric washers are adhered to and abutted against each other.

Optionally, the seat rod clamp assembly further comprises a seat rod bushing fixedly connected to the annular hoop, interfaced with the post hole, and configured to guide a seat rod to pass through the seat rod bushing and the post hole.

Optionally, the seat rod clamp assembly is configured for assembly on a seat tube, the annular hoop is fitted over an end of the seat tube, the seat rod bushing extends from the end of the seat tube into the seat tube, and the end of the seat tube is located between the annular hoop and the seat rod bushing.

Optionally, the seat rod bushing is configured to be eccentrically disposed relative to the seat tube, the seat rod bushing is provided with a spacer, and the spacer is configured to occupy a gap between the seat rod bushing and the inner wall of the seat tube.

The present utility model also provides a vehicle, comprising: a frame having a seat tube; the above seat rod clamp assembly assembled at an end of the seat tube; a seat rod disposed in the seat tube and extending from the post hole of the seat rod clamp assembly, the seat rod clamp assembly being configured to limit the relative position between the seat rod and the seat tube; a seat disposed on the seat rod; and a wheel rotatably disposed on the frame.

One technical effect of the present utility model is that the seat rod clamp assembly can be locked and opened conveniently.

Other features of the present utility model and its advantages will become apparent from the detailed description of the exemplary embodiments of the present utility model with reference to the accompanying drawings.

BRIEF DESCRIPTION OF THE DRAWINGS

The accompanying drawings, which constitute a part of the description, describe the embodiments of the present utility model and are used to explain the principle of the present utility model together with the description.

DETAILED DESCRIPTION

Various exemplary embodiments of the present utility model will now be described in detail with reference to the accompanying drawings. It should be noted that the relative arrangement of the components and steps, numerical expressions, and numerical values set forth in these embodiments do not limit the scope of the present utility model unless specifically stated otherwise.

The following description of at least one exemplary embodiment is merely illustrative in nature and by no means is to be construed as any limitation to the present utility model and its application or use.

Techniques, methods, and devices known to one of ordinary skill in the relevant art may not be discussed in detail but, where appropriate, the techniques, methods, and devices should be considered part of the description.

In all of the examples shown and discussed herein, any specific value should be interpreted as merely illustrative and not as a limitation. Therefore, other examples of the exemplary embodiments may have different values.

It should be noted that like reference numbers and letters designate similar items in the following figures; therefore, an item need not be further discussed in subsequent figures once the item is defined in a figure.

The present utility model provides a seat rod clamp assembly, which can be applied to a seat tube of a bicycle, an electric vehicle, a moped and the like for fixing the position of a seat rod on the seat tube. A user can open the seat rod clamp assembly to adjust the relative position of the seat rod to the seat tube.

Figure 1:
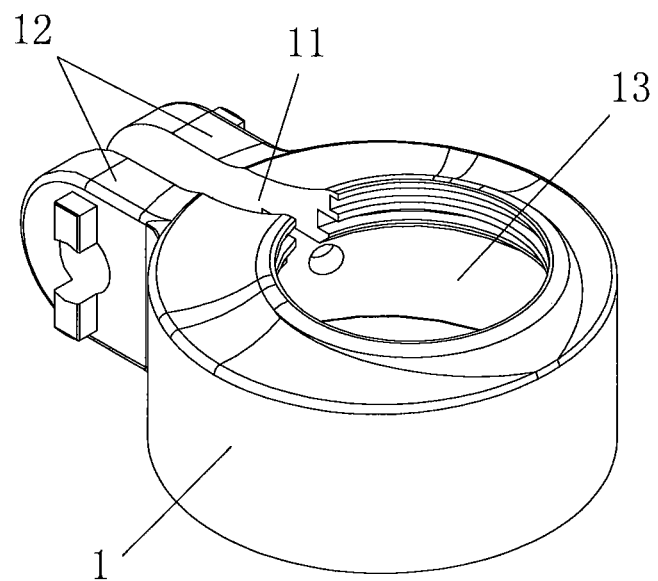
FIG. 1 is a schematic structural view of an annular hoop provided by the present utility model.

The seat rod clamp assembly includes at least an annular hoop, a wrench, and an eccentric washer 3. As shown in FIG. 1, the annular hoop 1 is wound into an annular structure. The annular hoop 1 has a notch 11. A locking portion 12 is formed on each side of the notch 11. The annular hoop 1 has a post hole 13 through which the seat rod of the vehicle passes. The annular hoop 1 is configured such that when the two locking portions 12 get close to each other, the post hole 13 can be deformed and locked. The annular hoop 1 is contracted and deformed to achieve locking and fixing of the seat rod passing through the post hole 13.

Figure 2:
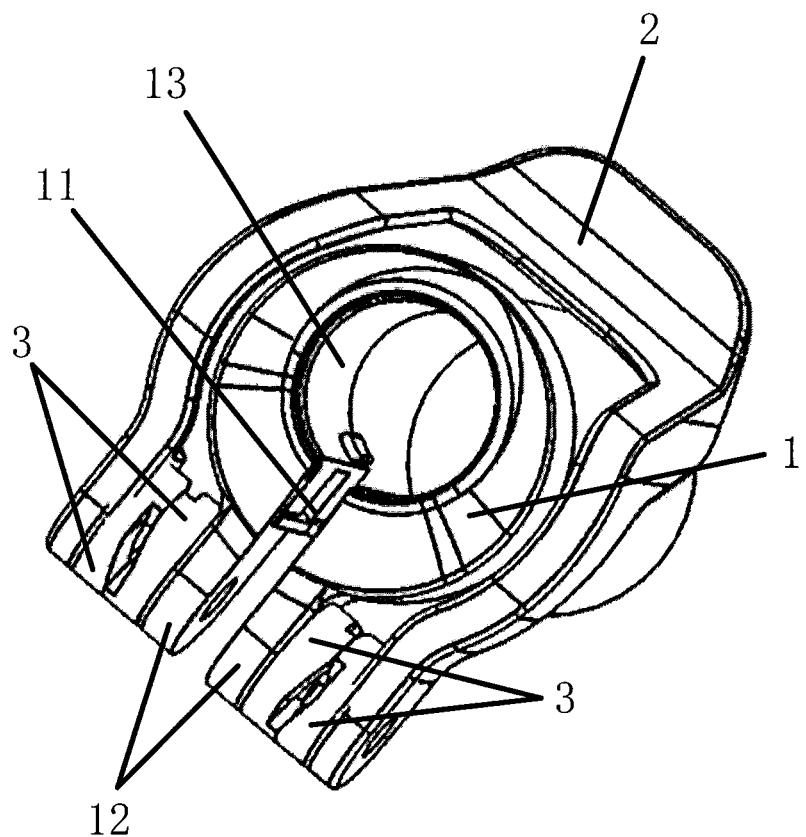
FIG. 2 is a schematic perspective view of a seat rod clamp assembly provided by the present utility model.

The wrench 2 is rotatably connected to the two locking portions 12. As shown in FIG. 2, the wrench 2 has two connecting arms. One of the connecting arms is rotatably connected to one of the locking portions 12, and the other of the connecting arms is rotatably connected to the other of the locking portions 12. The wrench 2 is configured to be rotatable in the axial direction of the post hole 13 to a locking position and a release position. That is, the wrench 2 can be rotated vertically along the annular hoop. When the wrench 2 is rotated to the locking position, the post hole 13 of the annular hoop 1 is locked. When the wrench 2 is rotated to the release position, the post hole 13 is released. The wrench 2 preferably constitutes a structure that spans two sides of the entire annular hoop 1, as shown in FIG. 2, which makes it less laborious during the pulling operation of the wrench 2.

Figure 3:
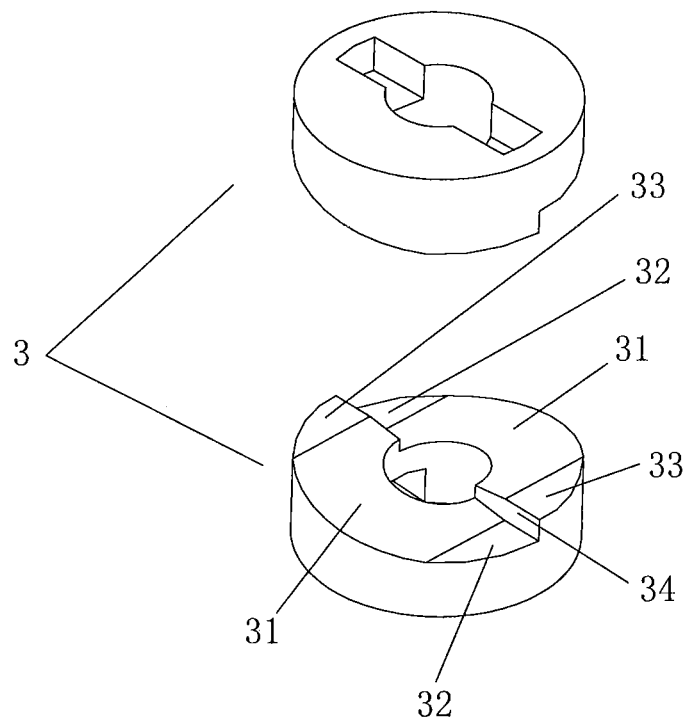
FIG. 3 is a schematic view showing the positional relationship of a pair of eccentric washers provided by the present utility model.
Figure 6:
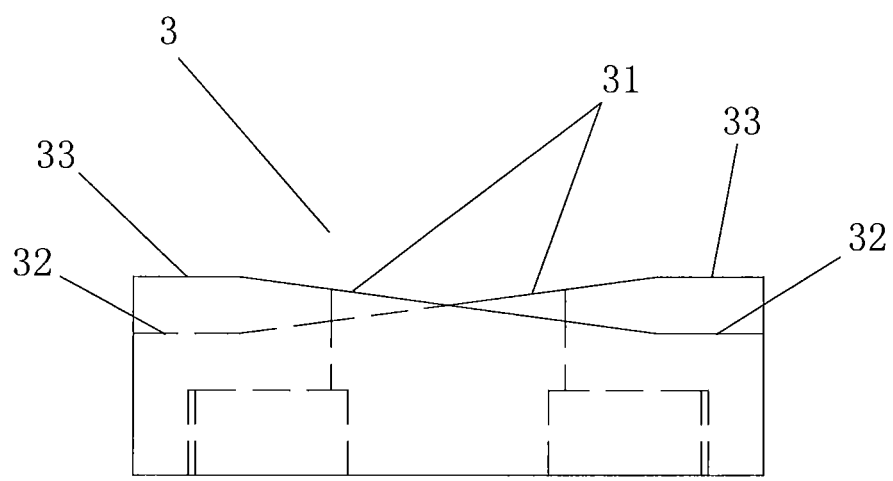
FIG. 6 is a side sectional view of an eccentric washer provided by the present utility model.

In particular, the seat rod clamp assembly includes at least one pair of eccentric washers 3. In the pair of eccentric washers 3, one of the eccentric washers 3 can be disposed on the wrench 2, and the other eccentric washer 3 is fixed to the locking portion 12. When the wrench 2 is rotatably assembled on the locking portion 12, the end surfaces of the two eccentric washers 3 are abutted against each other, as shown in FIG. 2. Further, each of the eccentric washers 3 has an inclined surface on the end surface thereof, as shown in FIGS. 3 and 6. The inclined surface causes the end surface of the eccentric washer 3 to have an undulating change in the height direction. When the wrench 2 is rotated to the locking position, the end surfaces of the two eccentric washers 3 are abutted against each other with a region of a high height. That is, as the wrench 2 rotates toward the locking position, one of the eccentric washers 3 rotates accordingly. Under the abutting guidance action of the inclined surface, the thickness of the position where the two eccentric washers 3 are in contact gradually increases, as shown in FIG. 2. This causes the overall thickness of the pair of eccentric washers 3 to be thickened. The opposite force causes the two locking portions 12 to approach each other, causing the post hole 13 to be deformed and locked.

The seat rod clamp assembly provided by the present utility model adopts a relative rotation position between at least one pair of eccentric washers to adjust the locking of the annular hoop, so that the locking action of the annular hoop is more accurate and easy to handle. Further, the wrench changes the structural shape and direction of rotation compared to conventional seat rod clamps. The wrench of the present utility model has a larger overall structure, and can adjust the spacing between the two locking portions of the annular hoop by rotating, so that a user can save efforts during operation. The wrench is pulled along the axial direction of the post hole, which is more convenient for the user to operate. The defects of a large force and inconvenient operation required for pulling the traditional seat rod clamping are overcome.

Optionally, in the embodiment shown in FIG. 1, the structural shapes of the two locking portions 12 are the same, which is not limited in the present utility model. In other embodiments, the locking portions 12 formed on two sides of the notch 11 may have different structural shapes.

Figure 4:
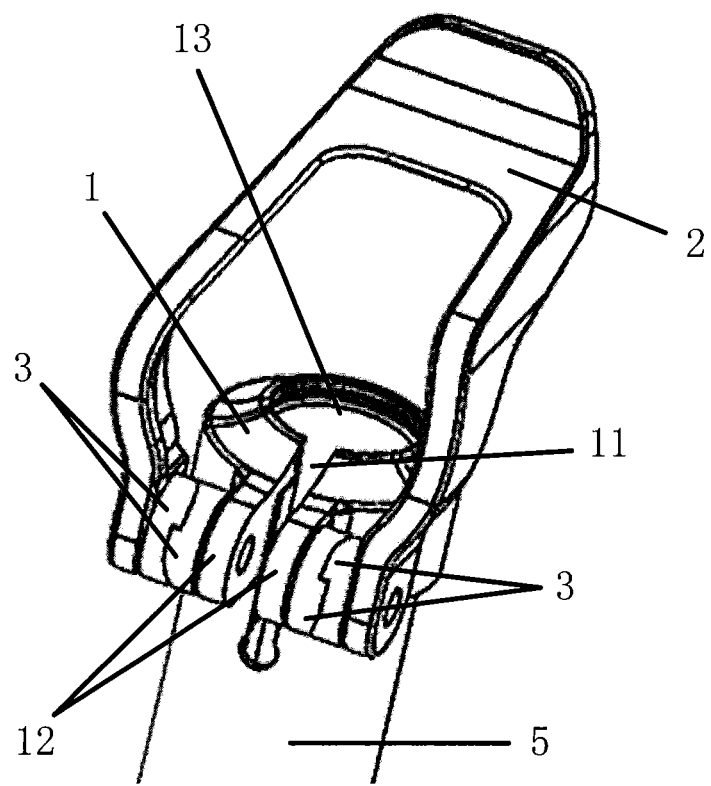
FIG. 4 is a perspective structural view of the seat rod clamp assembly provided by the present utility model.
Figure 5:
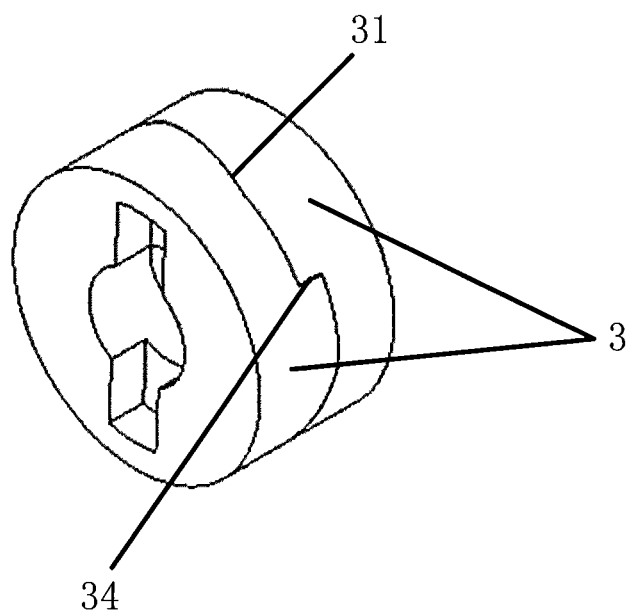
FIG. 5 is a schematic view showing the assembly of a pair of eccentric washers provided by the present utility model.

Further, the annular hoop 1 is configured such that when the two locking portions 12 get apart from each other, the post hole 13 is deformed and released, and the seat rod inserted therein can be released. When the annular hoop 1 is rotated to the release position as shown in FIG. 4, the pair of eccentric washers 3 is rotated to a position where the two end surfaces can be adhered to each other, as shown in FIGS. 4 and 5. Under the action of the end surfaces being adhered to each other, the overall thickness of the two eccentric washers 3 is reduced, and thus the two locking portions 12 further apart from each other under the self-deformation force of the annular hoop 1, which realizes the deformation and release of the post hole.

Preferably, the seat rod clamp assembly includes two pairs of eccentric washers 3, as shown in FIGS. 2 and 4. The two pairs of eccentric washers 3 are respectively in one-to-one correspondence with the two locking portions 12. One of each pair of eccentric washers 3 is fixed to the locking portion 12, and the other of each pair of eccentric washers 3 is fixedly connected to the connecting arms of the wrench 2. The connecting arms of the wrench 2 are rotatably connected to the locking portions 12. The end surfaces of the pair of eccentric washers 3 are abutted against each other. When the wrench 2 is rotated to the locking position as shown in FIG. 2, the overall thickness of the two pairs of eccentric washers 3 is increased. Since the two connecting arms of the wrench 2 are relatively rigid, the two locking portions 12 are pressed by the eccentric washers 3 and the connecting arms so as to be close to each other, and thus the post hole 13 is deformed and locked. When the wrench 2 is rotated to the release position as shown in FIG. 4, the overall thickness of the two pairs of eccentric washers 3 is reduced, the force applied by the annular hoop 1 is released, and the two locking portions 12 apart from each other, so that the post hole 13 is deformed and released.

An advantage of this embodiment is that the two ends of the annular hoop, that is, the two sides of the two locking portions, are structurally symmetrical. The two pairs of eccentric washers can act simultaneously, so that the two locking portions get close to or apart from each other. The locking force is relatively greater and the reliability is relatively higher. Moreover, the seat rod clamp assembly has a symmetrical structure, and thus can be exerted symmetrically and not easily damaged.

It should be noted that the present utility model does not limit the necessity of using two pairs of eccentric washers. In other embodiments, the locking function of the present utility model can also be realized by using only one pair of eccentric washers respectively disposed on the locking portion and the corresponding connecting arm.

As shown in FIGS. 3 and 6, the end surface of the eccentric washer 3 has an inclined surface which causes the end surface to have an undulation in the height direction. Preferably, at the highest point of the inclined surface, the end surface is further extended to form a horizontal platform surface 33. The horizontal platform surface 33 is perpendicular to the axial direction with respect to the cylindrical structure of the eccentric washer 3 itself. Correspondingly, the seat rod clamp assembly is preferably configured such that when the wrench 2 is rotated to the locking position, the relative positions of the two pairs of eccentric washers 3 can be rotated to enable the horizontal platform surfaces of the two eccentric washers 33 to be abutted against each other, as shown in FIG. 2. The two eccentric washers 3 in this state are pressed by the deformation force of the annular hoop 1. If the end surfaces of the two eccentric washers 3 at this time are abutted against each other by the inclined, surfaces, a component force of the pressing force on the inclined surfaces may cause the eccentric washers 3 to relatively rotate. As a result, there is a risk that the two locking portions get apart from each other and the post hole is released by itself. The advantage of the solution having the horizontal platform surface 33 is that when the horizontal platform surfaces 33 of the two eccentric washers 3 are abutted against each other, the deformation force generated by the annular hoop 1 will not incur a component force on the horizontal platform surface 33 which causes the eccentric washers 3 to rotate oppositely, and thus the above risk is eliminated. The seat rod clamp assembly is more reliable and safer.

Further, as shown in FIGS. 3 and 6, preferably, at the lowest point of the inclined surface, the end surface may further extend to form a horizontal bottom surface 32. The horizontal platform surface 33 is perpendicular to the axial direction with respect to the cylindrical structure of the eccentric washer 3 itself. The horizontal bottom surface 32 is combined with the embodiment in which the horizontal platform surface 33 is formed, so that the relative rotation and adhesion of the two eccentric washers 3 are smoother. Correspondingly, the seat rod clamp assembly is preferably configured such that when the wrench 2 is rotated to the release position as shown in FIG. 4, the horizontal bottom surface 32 of one of the eccentric washers 3 and the horizontal platform surface 33 of the other eccentric washer 3 are abutted against each other, as shown in FIGS. 3 and 5. The advantage of this design is that the two eccentric washers can be more closely adhered to each other without the edge of the inclined surface scratching the other eccentric washer. The convenience and service life of the seat rod clamp assembly can be improved/extended.

Optionally, as shown in FIGS. 3 and 6, the end surface of the eccentric washer 3 has at least two inclined surfaces that are rotationally symmetrically distributed. In this way, the eccentric washer 3 is uniformly stressed overall during the relative rotation and abutting, the reliability is stronger, and the relative rotation is smoother. The end surface of the eccentric washer 3 shown in the drawing has two inclined surfaces which are distributed symmetrically with respect to the axial center (one type of rotational symmetry). The horizontal bottom surface 32 extends from the bottom of the inclined surface, and the horizontal platform surface 33 extends from the top of the inclined surface. In other embodiments, the end surface of the eccentric washer may further have three or four inclined surfaces that are rotationally symmetric with respect to the axial center, which is not limited in the present utility model. Of course, the end surface of the eccentric washer can also have only one inclined surface, and the function of the seat rod clamp assembly can also be realized.

Further, a stepped stop surface 34 may be formed on the end surface of the eccentric washer 3. The stepped stop surface 34 is connected between the horizontal platform surface 33 at the highest point of one inclined surface and the horizontal bottom surface 32 at the lowest point of the other inclined surface, as shown in FIG. 3. The stepped stop surface 34 may be parallel to the axial direction of the eccentric washer 3. The stepped stop surface 34 is used to stop the relative rotational positions of the pair of two eccentric washers 3. Each pair of eccentric washers is configured such that when the wrench is rotated to the release position, the stepped stop surfaces of the two eccentric washers are abutted against each other to prevent further rotation of the eccentric washer and the wrench. This design allows the seat rod clamp assembly to have a predetermined and unambiguous release position. The post hole can be released to the maximum extent as long as the wrench is rotated to this release position. It is convenient for the user to operate in actual application without causing damage to the seat rod clamp assembly due to misoperation.

The locking position to which the wrench is rotated can be determined by the relative position of the seat rod clamp assembly with respect to the seat tube that is assembled. When the wrench is rotated to a position blocked by the seat tube, the annular hoop should have reached a deformed and locked state. At this time, it is preferable that the highest points of the inclined surfaces of the eccentric washers are abutted against each other, or the horizontal platform surfaces are abutted against each other. The wrench cannot continue to rotate due to the stop of the seat tube, and this position can be used as the locking position.

Figure 7:
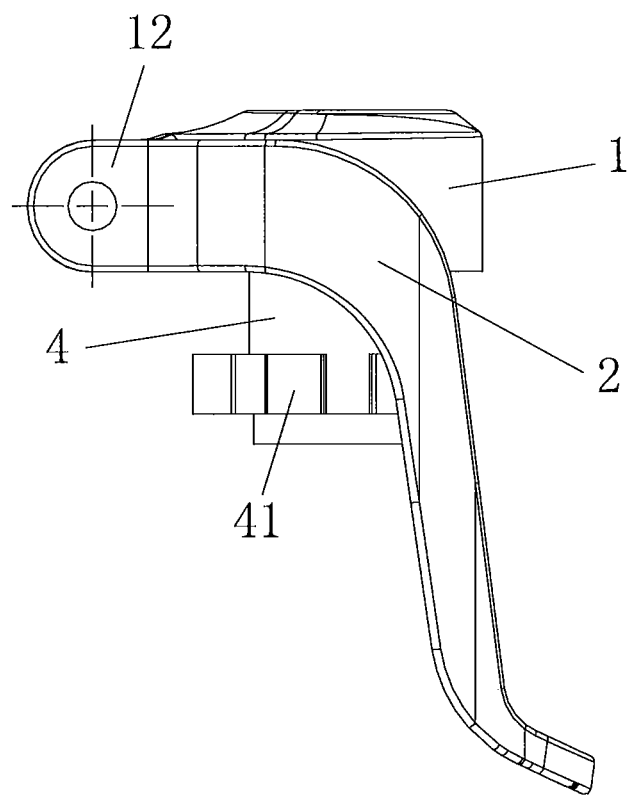
FIG. 7 is a side view of the seat rod clamp assembly provided by the present utility model.
Figure 9:
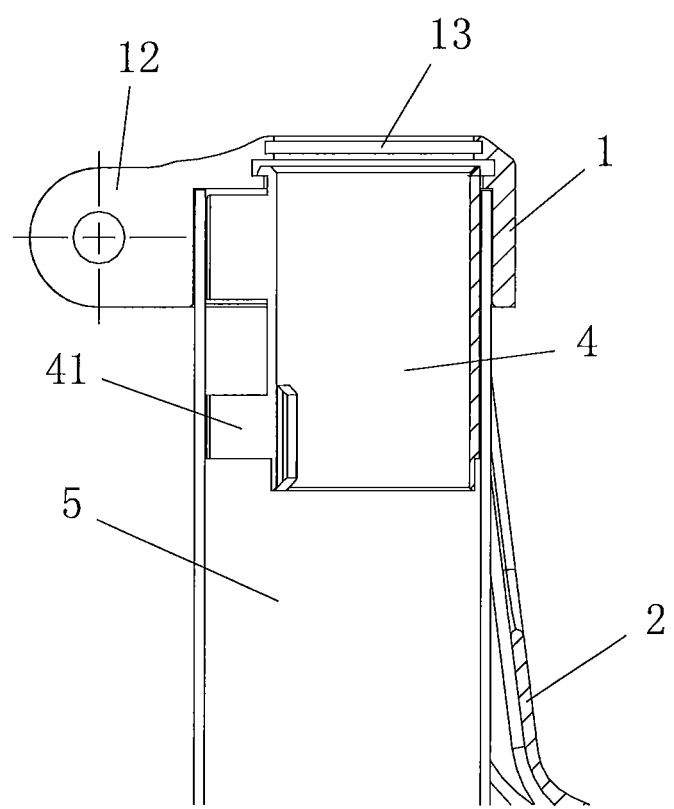
FIG. 9 is a side sectional view of the seat rod clamp assembly provided by the present utility model and sleeved on a seat tube.

In another aspect, the seat rod clamp assembly can also include a seat rod bushing 4, as shown in FIGS. 7 and 9. The seat rod bushing 4 is used to position the seat rod of the vehicle. There may be a large difference between the diameters of the seat tube 5 and of the seat rod of the vehicle. The seat rod is inserted into the seat rod bushing 4, and the seat rod bushing 4 can fill the gap between the seat tube 5 and the seat rod, thereby positioning the seat rod. The seat rod bushing 4 is fixedly connected to the annular hoop 1, and is interfaced with the post hole 13, as shown in FIG. 9. The seat rod bushing 4 is configured such that the seat rod mounted to the vehicle is able to pass through the seat rod bushing 4 and the post hole 13.

The seat rod clamp assembly of the present utility model is configured for assembly on a seat tube 5 of a vehicle, as shown in FIG. 9. The annular hoop 1 is fitted over an end of the seat tube 5. The seat rod bushing 4 projects into the seat tube 5 from the end of the seat tube 5. The end of the seat tube 5 is located between the annular hoop 1 and the seat rod bushing 4.

Figure 8:
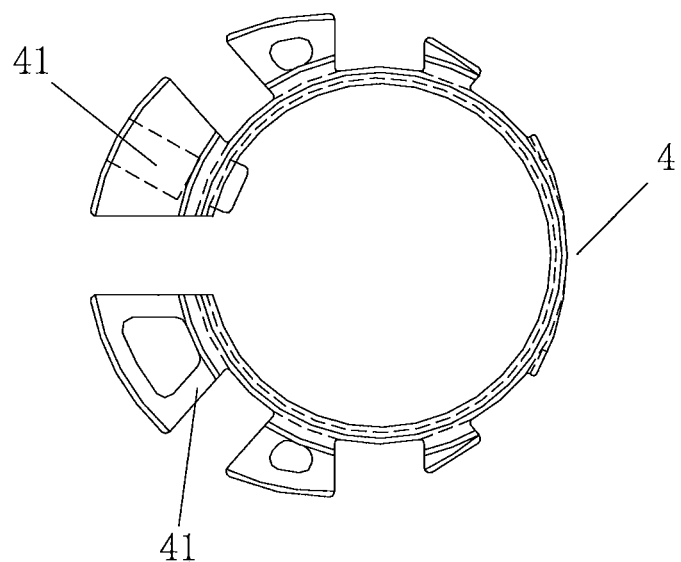
FIG. 8 is a top plan view of a seat rod bushing provided by the present utility model.

Optionally, in the case where the diameter of the seat tube of the vehicle to be assembled differs greatly from the diameter of the seat rod, the seat rod bushing 4 may be configured to be eccentrically disposed relative to the seat tube. In this way, the seat rod is eccentrically disposed with respect to the seat tube, and a part of the space is reserved in the seat tube. As shown in FIG. 8, the seat rod bushing 4 is provided with a spacer 41 which is configured to occupy a gap between the seat rod bushing 4 and the inner wall of the seat tube.

The present utility model further provides a vehicle including a frame, the above-described seat rod clamp assembly, a seat rod seat, and a wheel. The frame has a seat tube. The seat rod clamp assembly is assembled at an end of the seat tube. The seat rod is disposed in the seat tube and can extend upward from the post hole of the seat rod clamp assembly. When the post hole of the seat rod clamp assembly is locked, the relative position between the seat rod and the seat tube can be fixed. When the post hole is released, the seat rod can be loosened to adjust the relative position of the seat rod and the seat tube. The seat is disposed on the seat rod, and the wheel is rotatably disposed on the frame. The seat rod clamp assembly of the present utility model can be operated conveniently in a labor-saving manner. A user of the vehicle can conveniently operate the seat rod clamp assembly to realize the height adjustment of the seat. The wrench described above can be rotated along the axial direction of the post hole, and the wrench can be rotated vertically along the axial direction of the seat tube or the seat rod or the post hole.

The vehicle provided by the present utility model may be a bicycle, a tricycle, an electric vehicle, a moped, etc., and the specific vehicle type is not limited. The seat rod clamp assembly provided by the present utility model can be used as long as the seat tube and the seat rod are required.

Although some specific embodiments of the present utility model have been described in detail by way of example, those skilled in the art should understand that the above examples are only for the purpose of illustration and are not intended to limit the scope of the present utility model. It will be understood by those skilled in the art that the above embodiments may be modified without departing from the scope and spirit of the present utility model. The scope of the present utility model is defined by the appended claims.

The invention claimed is:

1. A seat rod clamp assembly, comprising:
   an annular hoop comprising a notch, the annular hoop comprising locking portions on each side of the notch, the annular hoop comprising a post hole, and the annular hoop being configured such that when the locking portions get close to each other, the post hole is deformed and locked;
   a wrench rotatably connected to the locking portions, the wrench being configured to be axially rotatable along an axial direction of the post hole to a locking position and a release position; and
   at least one pair of eccentric washers, wherein a first one of the eccentric washers is fixed to a first one of the locking portions, a second one of the eccentric washers is correspondingly fixed to the wrench, wherein a first end surface of the first one of the eccentric washers has a first inclined surface and a second end surface of the second one of the eccentric washers has a second inclined surface, and the first and second end surfaces of the eccentric washers are abutted against each other,
   wherein the at least one pair of eccentric washers is configured such that when the wrench is rotated to the locking position, an overall thickness of the two eccentric washers is thickened under the abutting guidance action of the first inclined surface or the second inclined surface to make the locking portions get close to each other.

2. The seat rod clamp assembly according to claim 1,
   wherein the annular hoop is configured such that when the locking portions get apart from each other, the post hole is deformed and released, and
   wherein when the wrench is rotated to the release position, the overall thickness of the at least one pair of eccentric washers is thinned by the first and second end surfaces being adhered to each other so that the locking portions get apart from each other.

3. The seat rod clamp assembly according to claim 1,
   wherein the at least one pair of eccentric washers comprise two pairs of eccentric washers,
   wherein the two pairs of eccentric washers respectively correspond to two locking portions,
   wherein the wrench has two arms, and wherein the two arms form a one-to-one rotational connection with the two locking portions.

4. The seat rod clamp assembly according to claim 1,
wherein the first end surface of the first eccentric washer extends at a highest point of the first inclined surface to a first horizontal platform surface,
wherein the second end surface of the second eccentric washer extends at a highest point of the second inclined surface to a second horizontal platform surface, and
wherein when the wrench is rotated to the locking position, the first and second horizontal platform surfaces of the first and second eccentric washers are abutted against each other.

5. The seat rod clamp assembly according to claim 2,
wherein the first end surface of the first eccentric washer extends at a highest point of the first inclined surface to a first horizontal platform surface,
wherein the second end surface of the second eccentric washer extends at a highest point of the second inclined surface to a second horizontal platform surface, and
wherein when the wrench is rotated to the locking position, the first and second horizontal platform surfaces of the first and second eccentric washers are abutted against each other,
wherein the first end surface of the first eccentric washer extends at a lowest point of the inclined surface to form a horizontal bottom surface, and
wherein when the wrench is rotated to the release position, the horizontal bottom surface of the first eccentric washer and the horizontal platform surface of the second eccentric washer are abutted against each other.

6. The seat rod clamp assembly according to claim 5,
wherein the first end surface of the eccentric washer comprises at least two inclined surfaces distributed in a rotationally symmetric manner and comprising a first stepped stop surface,
wherein the second end surface of the eccentric washer comprises a second stepped stop surface,
wherein the horizontal platform surface at a highest point of a first inclined surface of the at least two inclined surfaces and the horizontal bottom surface at the lowest point of a second inclined surface of the at least two inclined surfaces are connected by the stepped stop surface, and
wherein when the wrench is rotated to the release position, the first and second stepped stop surfaces of the first and second eccentric washers are adhered to and abutted against each other.

7. The seat rod clamp assembly according to claim 1, further comprising a seat rod bushing fixedly connected to the annular hoop, interfaced with the post hole, and configured to guide a seat rod to pass through the seat rod bushing and the post hole.

8. The seat rod clamp assembly according to claim 7, wherein the seat rod clamp assembly is configured for assembly on a seat tube, the annular hoop is fitted over an end of the seat tube, the seat rod bushing extends from the end of the seat tube into the seat tube, and the end of the seat tube is between the annular hoop and the seat rod bushing.

9. The seat rod clamp assembly according to claim 8, wherein the seat rod bushing is configured to be eccentrically disposed relative to the seat tube, the seat rod bushing is provided with a spacer, and the spacer is configured to occupy a gap between the seat rod bushing and the inner wall of the seat tube.

10. A vehicle, comprising:
a frame comprising a seat tube;
a seat rod clamp assembly according to claim 1, the seat rod clamp assembly being at an end of the seat tube;
a seat rod disposed in the seat tube and extending from the post hole of the seat rod clamp assembly, wherein the seat rod clamp assembly is configured to limit the relative position between the seat rod and the seat tube;
a seat disposed on the seat rod; and
a wheel rotatably disposed on the frame.

* * * * *